No. 618,436. Patented Jan. 31, 1899.
J. C. PARKER.
NUT LOCK.
(Application filed Apr. 29, 1898.)
(No Model.)

Witnesses

James C. Parker, Inventor.

By his Attorneys.

UNITED STATES PATENT OFFICE.

JAMES CONNELL PARKER, OF WOODSTON, KANSAS.

NUT-LOCK.

SPECIFICATION forming part of Letters Patent No. 618,436, dated January 31, 1899.

Application filed April 29, 1898. Serial No. 679,216. (No model.)

*To all whom it may concern:*

Be it known that I, JAMES CONNELL PARKER, a citizen of the United States, residing at Woodston, in the county of Rooks and State of Kansas, have invented a new and useful Nut-Lock, of which the following is a specification.

The invention relates to improvements in nut-locks.

The object of the present invention is to improve the construction of nut-locks and to provide a simple, inexpensive, and efficient one adapted to be readily applied to bolts and nuts without necessitating any alteration in the construction of the same and capable of absolutely preventing a nut from accidentally unscrewing, thereby enabling bolts and nuts to be safely applied to rails and various constructions subject to jar and vibration.

A further object of the invention is to provide a nut-lock adapted to take the place of a washer and to be interposed between a nut and a fish-plate or other part to be clamped and capable, should a nut be rotated backward by hand or other means, of forcing the nut longitudinally of the bolt faster than the outward movement permitted by the threads, whereby the nut will be crowded on the threads and be prevented from following the same, so that if such retrograde rotation of the nut be continued the threads of the bolt or nut will be destroyed, thereby producing a nut-lock wherein the threads of the bolt and the nut will resist the backward movement of the latter.

The invention consists in the construction and novel combination and arrangement of parts hereinafter fully described, illustrated in the accompanying drawings, and pointed out in the claim hereto appended.

Figure 1:
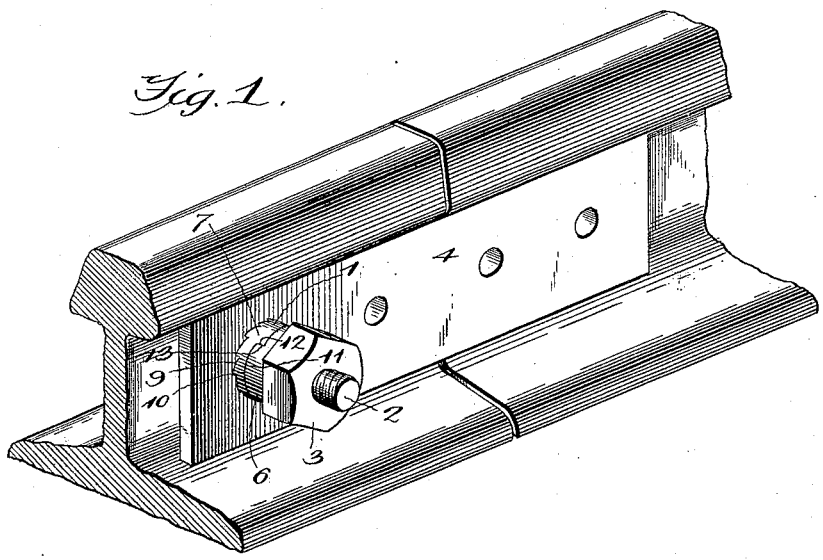
Figure 2:
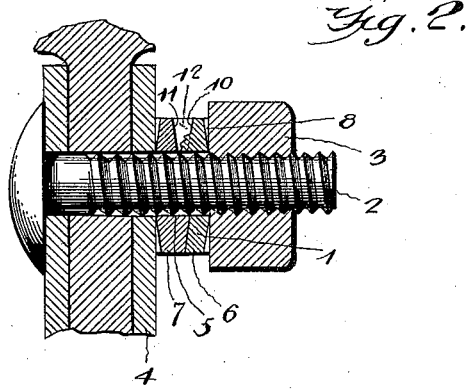
Figure 3:
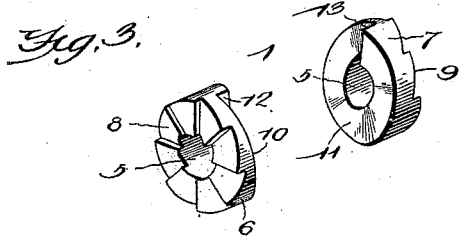

In the drawings, Figure 1 is a perspective view of a nut-lock constructed in accordance with this invention and shown applied to a portion of a rail-joint. Fig. 2 is a sectional view taken longitudinally of the bolt. Fig. 3 is a perspective view of the locking-washer, the sections being separated.

Like numerals of reference designate corresponding parts in all the figures of the drawings.

1 designates a locking-washer forming a nut-lock and designed to be mounted on a bolt 2 and interposed between a nut 3 and a fish-plate 4 or other part to be held, as clearly illustrated in Fig. 1 of the accompanying drawings, to prevent the nut from accidentally unscrewing. The bolt and the nut are of the ordinary construction, and the locking-washer, which is interposed between the nut and the fish-plate, is adapted to take the place of an ordinary washer.

The locking-washer, which has a smooth bolt-opening 5, is composed of two sections 6 and 7, having outer ratchet-faces 8 and 9 and provided with smooth inner cam-faces 10 and 11, which may extend entirely around the sections, as illustrated in the accompanying drawings, or be composed of a series of similar shorter faces. The outer ratchet-faces, which are arranged parallel with each other, have their teeth shouldered in opposite directions and are adapted to engage the fish-plate and the inner face of the nut, and the said ratchet-faces, which may be formed of teeth, as shown in the accompanying drawings, can be constructed in any suitable manner, and as the sections are designed to be constructed of material harder than the nut and the fish-plate the sections are adapted to bite into the said nut and fish-plate and obtain a firm hold on the same. The teeth or other form of projections employed to produce a ratchet-face will permit the nut to be passed over them with comparatively slight resistance as the said nut is rotated in a forward direction. When the nut has been screwed firmly against the washer, its teeth or projections will be embedded sufficiently in the fish-plate and in the nut to hold the inner sections stationary and to cause the outer section to rotate with the nut should the latter be unscrewed.

The cam-faces of the sections are disposed in the same general direction as the threads of the bolt and nut, and they form abrupt shoulders 12 and 13, arranged longitudinally of the bolt and abutting together when the sections are in their normal position and not expanded. The sections vary in thickness, being gradually tapered from the shoulders formed by the cam-faces, and the wedge-shaped portions or cams cause the sections to expand when the shoulders 12 and 13 are separated by the rotation or rotary movement of the outer section. The inner faces of the sections match, the cams being reversely arranged and each section being provided opposite the cam of the other section with a corresponding recess receiving the same. The pitch of the cam-faces is greater than the pitch of the screw-threads, whereby when the nut is rotated backward and carries with it the outer section the latter will cause it to move outward on the bolt faster than the screw-threads will permit, thereby crowding the nut on the screw-threads, which will resist the outward movement of the nut and prevent it from accidentally unscrewing. Should the nut be forced backward, the threads of the bolt or nut would be crowded together to such an extent that they would be destroyed. The pitch of the cam-faces may be varied, as desired, and so long as the said pitch is greater than the pitch of the screw-threads the latter will effectually resist any unscrewing of the nut which cannot become loosened by jar or vibration. As the washer expands with the unscrewing of the nut the parts held by the bolt cannot become loosened by any backward movement of the nut.

The invention has the following advantages: The nut-lock, which is simple and comparatively inexpensive in construction, is adapted to be readily applied to ordinary bolts and nuts without necessitating any alteration in their construction, and it is capable of absolutely preventing a nut from accidentally unscrewing and is especially adapted for use on rail-joints, bridges, and various other constructions subject to jar and vibration. The sections of the washer by being similar may be made from the same mold and are reversible or interchangeable, and as they form a solid washer when they are applied to a bolt they may be constructed very light without liability of breaking. The inner faces of the sections are smooth and are adapted to move over each other with a minimum amount of friction, and the outer engaging or ratchet faces are capable of positively engaging the inner face of a nut and a fish-plate, so that the inner section will be held stationary and the outer section will move with the nut and expand the washer should the nut rotate backward. The sections by having the reversely-arranged cams at their inner faces are adapted to fit together throughout the entire area of the same and form a solid washer.

Changes in the form, proportion, and minor details of construction may be resorted to without departing from the spirit or sacrificing any of the advantages of the invention, such as adapting the nut-lock to brace-rods and other threaded parts where it is desired to lock a nut.

What I claim is—

In a nut-lock, the combination with a bolt, and a nut, of a locking-washer having a smooth bolt-opening and composed of two similar interchangeable or reversible sections provided with outer ratchet-faces for engaging the smooth faces of the nut and the part to be clamped, and having matching inner faces with reversely-disposed cams and corresponding recesses, the cams of one section extending entirely around the same and fitting in and filling the recesses of the other section and vice versa, to provide a solid washer, said cams being formed with abrupt shoulders at the points where they merge into the recesses and being of greater pitch than the threads of the bolts and abutting against and adapted to ride on each other when the nut is unscrewed, substantially as described.

In testimony that I claim the foregoing as my own I have hereto affixed my signature in the presence of two witnesses.

JAMES CONNELL PARKER.

Witnesses:
H. D. McINTIRE,
W. A. COOPER.